United States Patent [19]

Conerly

[11] 4,041,465
[45] Aug. 9, 1977

[54] SCANNER-DISTRIBUTOR APPARATUS FOR MATRIX SYSTEM

[75] Inventor: Howard Jeffery Conerly, Milan, Tenn.

[73] Assignee: International Telephone and Telegraph Corporation, New York, N.Y.

[21] Appl. No.: 680,743

[22] Filed: Apr. 27, 1976

[51] Int. Cl.² .................. G06F 3/00; H04M 3/22; H04Q 3/54
[52] U.S. Cl. .................. 364/900; 179/18 FG
[58] Field of Search .............. 179/18 FF, 18 FG; 340/172.5; 445/1

[56] References Cited

U.S. PATENT DOCUMENTS

| | | | |
|---|---|---|---|
| 3,202,767 | 8/1965 | Warman | 179/18 FG |
| 3,420,960 | 1/1969 | Jacoby et al. | 179/18 FG |
| 3,517,123 | 6/1970 | Harr et al. | 179/18 FF |
| 3,560,655 | 2/1971 | Roth | 179/18 FF |
| 3,651,484 | 3/1972 | Smeallie | 340/172.5 |
| 3,826,872 | 7/1974 | MacGregor | 179/18 FG |
| 3,906,163 | 9/1975 | Brenski et al. | 340/172.5 X |

*Primary Examiner*—Harvey E. Springborn
*Attorney, Agent, or Firm*—J. B. Raden; M. M. Chaban

[57] ABSTRACT

Disclosed is a wholly electronic system for either testing or changing the state of a bi-stable circuit element such as a crosspoint of a switching matrix under the control of a central processor (CPU). A maximum of 256 groups of 128 points may either have the condition changed (driven) or the condition read (scan) by the apparatus shown under the control of a processor such as a 16-bit CPU. Interfacing between the CPU and the switching matrix is a bi-directional multiplex gating and decoding tree network having at its outer extremities the points. Each point is represented by an address comprised of bits representing word, basket, group and level. By addressing a point and then providing a control indication as to whether the condition of a point is to be read or whether the condition of a point or group of points is to be changed, the points can be readily scanned or driven according to instructions received from the CPU through a logic unit or controller.

7 Claims, 9 Drawing Figures

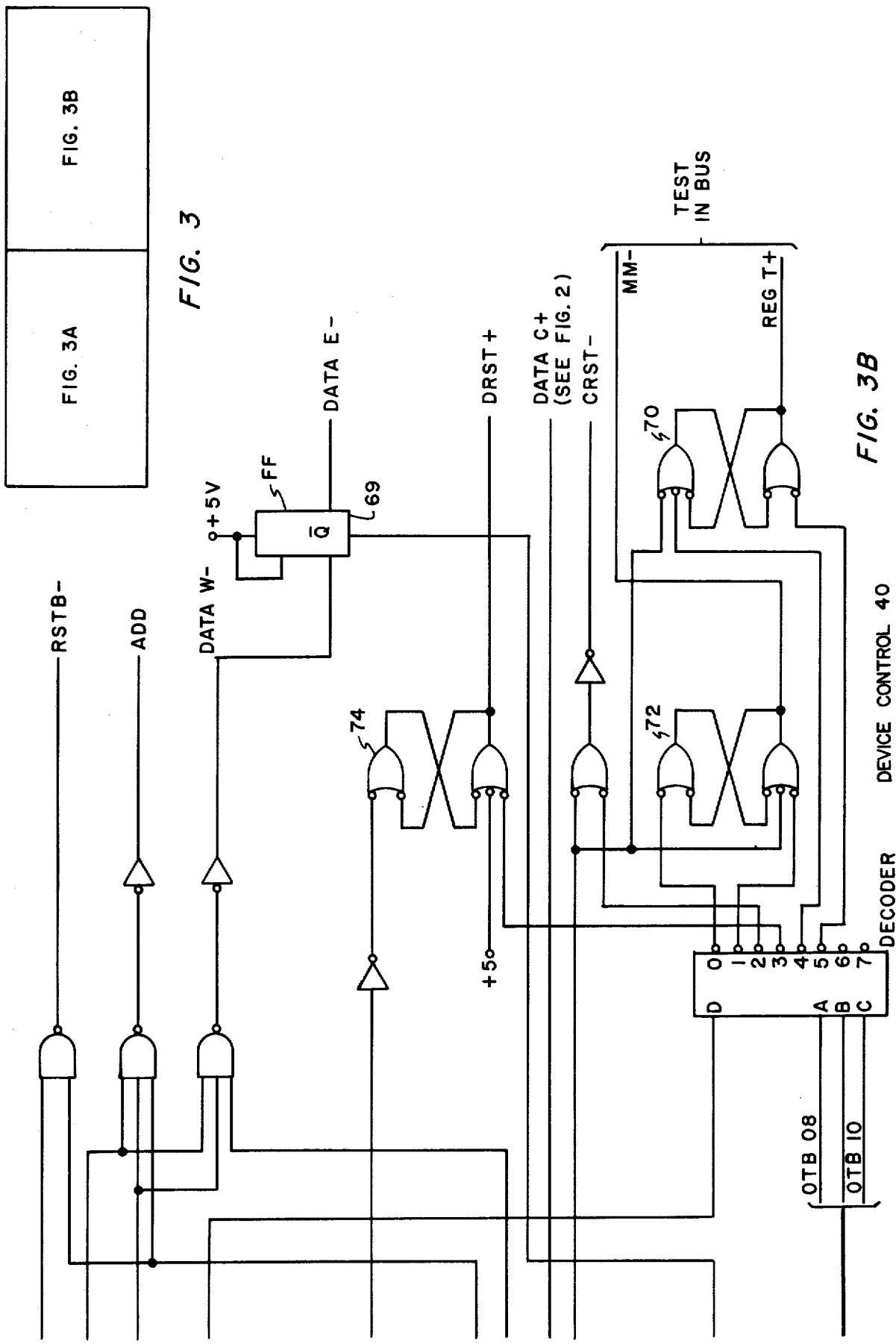

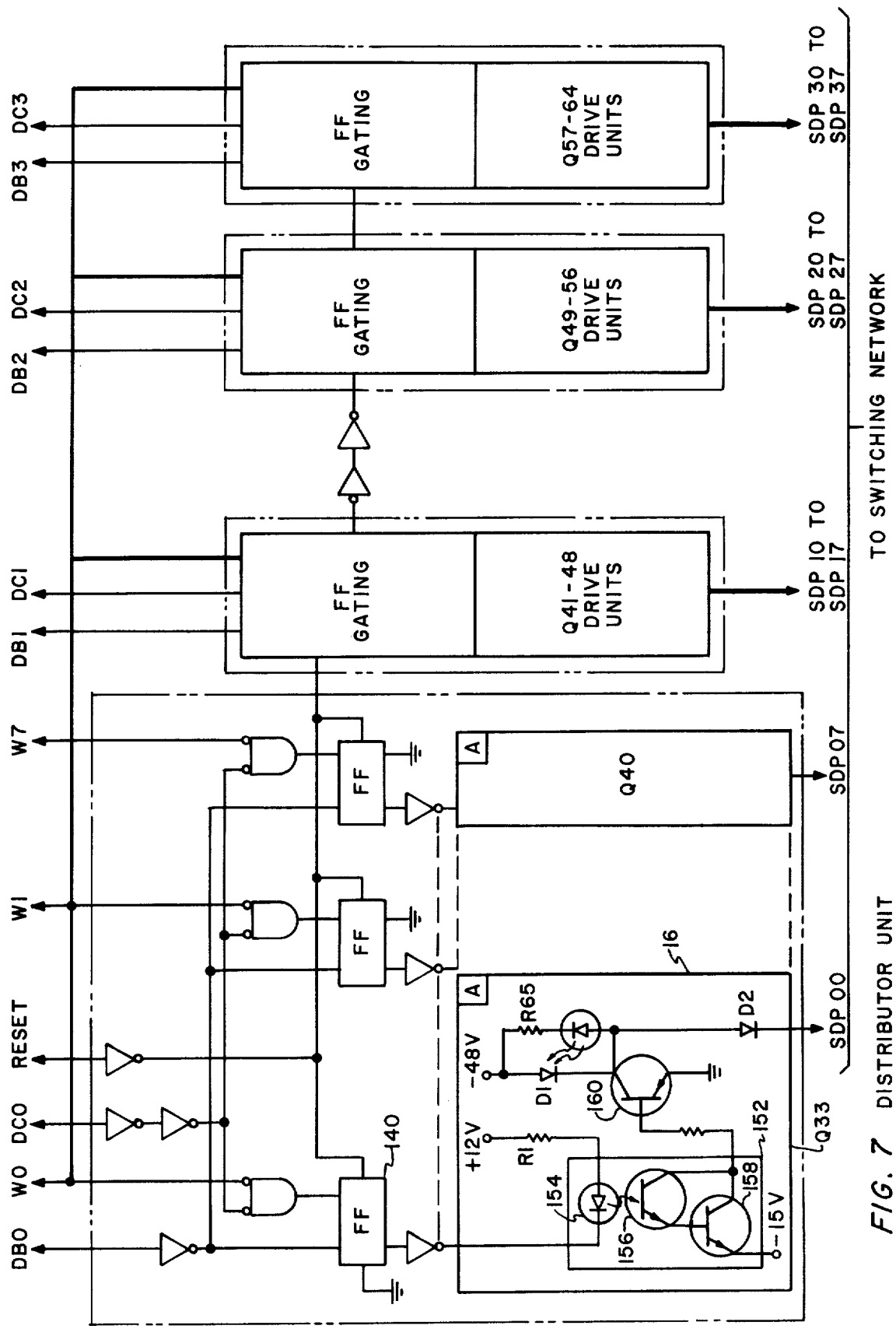
FIG. 7 DISTRIBUTOR UNIT

SCANNER-DISTRIBUTOR APPARATUS FOR MATRIX SYSTEM

BACKGROUND OF THE INVENTION

In conventional tree networks for testing points of a switching network, separate controls must be provided for each function which is to be performed. For example, U.S. Pat. No. 3,872,324 issued Mar. 18, 1975, a system for sequentially testing binary matrix points or contacts is shown. An address counter and decoder is provided with selection gating circuits directed toward relay contacts of an electromechanical switching matrix.

Other known circuits use many variations and combinations of latches and/or NOR circuits to provide the testing of various crosspoint or matrix contacts. Other systems provide a parallel matrix or map to control the testing of switching matrix crosspoints.

SUMMARY OF THE INVENTION

The present invention is directed to a system including a network which includes a plurality of coder-decoder (MUX) stages and control logic for reading out and writing in conditions at a plurality of conductors such as those constituting the crosspoints of a switching matrix of bi-stable elements. The network is under the control of a sixteen-bit central processor of any known type.

Interfacing between the processor and the MUX stages of the network is a controller circuit. The controller provides logic for control of the transmission of address and data signals in either direction in accordance with the instructions received from the processor for decoding three addresses and six control words. The stages of the MUX or coder-decoder are provided by conventional binary to octal and octal to binary coders for coding stages labeled respectively level, group, basket and word. A sixteen-bit address is used to find a desired point. A control word is used as the instruction determining whether the point is to be acted upon (driven) or its condition read (scanned). A portion of the selected word is used to determine whether a single point is to be driven to a predetermined condition. In addition, data information may be sent to an addressed crosspoint following its having been accessed for drive purposes.

It is therefore an object of the invention to provide an apparatus for readily interrogating plural conductors capable of bi-stable conditions such as crosspoint of a matrix within a multiple stage switching matrix for the conductor condition, and to use the same apparatus to control the operation of each crosspoint.

It is a further object of the invention to provide an improved network including a plurality of multiplexing stages for scanning the crosspoints of a system for condition or for changing the condition of a crosspoint if so desired.

It is a further object of the invention to provide an apparatus for interfacing between a central processor and a plurality of bi-stable points to read the condition of any point for transmission of the condition to the processor and for changing the condition of any point on request from the processor, and for transmitting data to any such point once its condition has been changed.

Other objects, features and advantages of the invention will become apparent from the following description of the accompanying drawings.

BRIEF DESCRIPTION OF THE DRAWINGS:

FIG. 7 is a schematic circuit diagram of the distributor unit circuit of FIG. 1.

DETAILED DESCRIPTION

Figure 1:
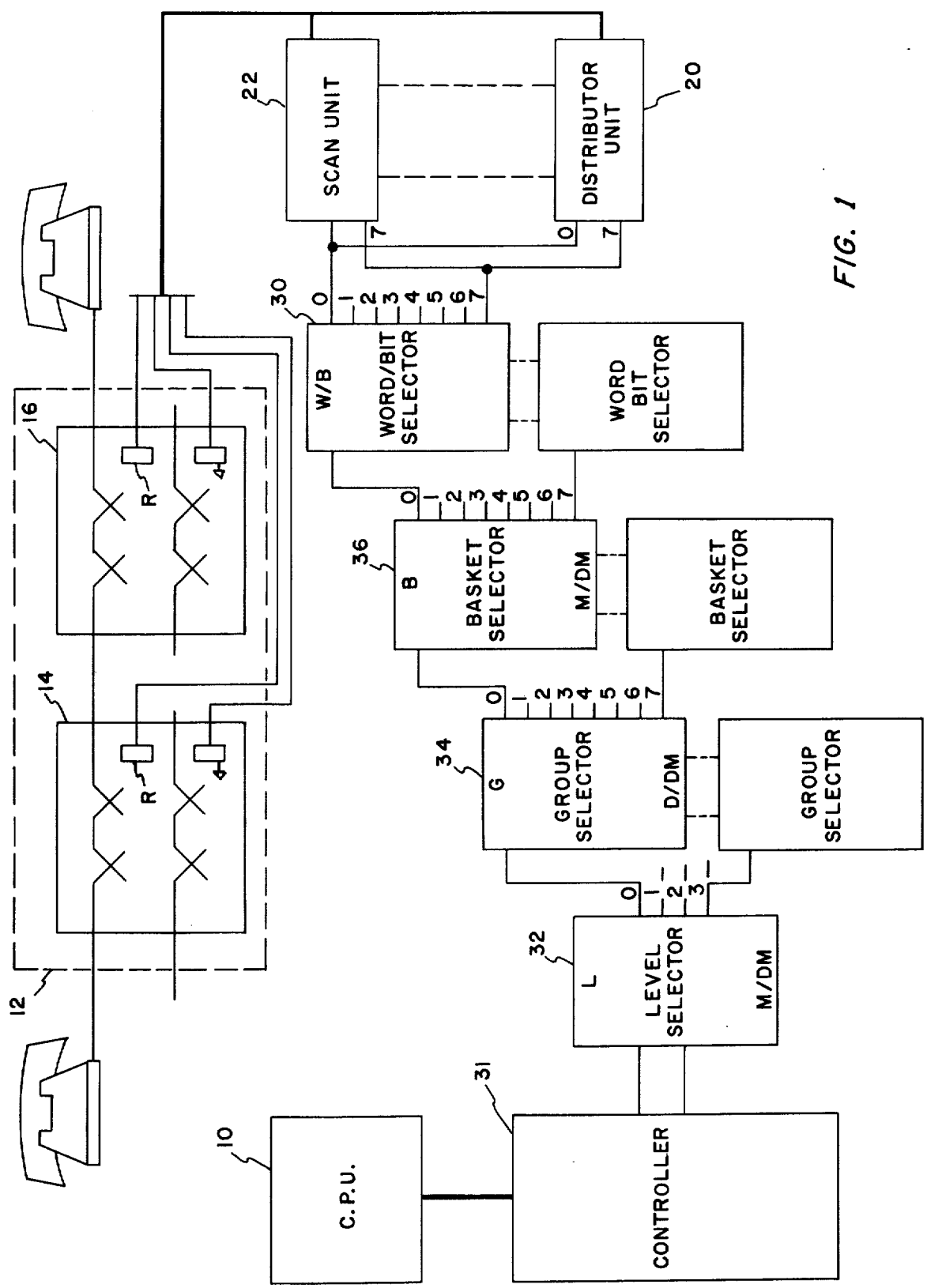
FIG. 1 is a schematic block diagram of a system employing my invention.

In FIG. 1, I show my invention interfacing between a central processor (CPU) 10 and crosspoints of a switching network of any known type. The processor 10 may be of any known sixteen-bit general purpose computer such as many models of the General Automation SPC-16, as generally available commercially, or the PDP-11 machine sold by the Digital Equipment Corporation. The matrix network may be of the type shown in U.S. Pat. No. 3,441,677 for Automatic Switching Matrix as issued Apr. 29, 1969 to E. L. Erwin et al. Such a switching network or system is known and has been manufactured and sold by the Assignee hereof as the A-1 Crossbar System.

The switching network 12, shown exemplarily as having two stages 14 and 16, may be folded or non-folded. The network shown, for example, is a non-folded one. In the switching network 12, each crosspoint has a bi-stable element such as electro-mechanical relay R acting as the crosspoint. For each such crosspoint, there is provided a pair of optical coupling interface units (shown in greater detail in FIGS. 6 and 7) or opto-isolators, the first unit being a distributor or relay drive unit 20 (FIG. 7) for driving the crosspoint, and the second unit being the scan unit 22 (FIG. 6) for scanning the condition of the crosspoint closure contacts of relay R. The pair of units 20 and 22 interface between the crosspoint network 12 and the multiplexer network by way of the word/bit selector 30. The multiplexer network is controlled by a device controller 31. The controller 31 (shown in detail in FIGS. 2 and 3) provides control logic in responding to signals from the processor 10 and commanding the network accordingly. The multiplexer is comprised of a plural stage tree decoder using binary to octal coding and octal to binary decoding including a level selector stage 32, a group selector stage 34, and the basket selector 36.

The apparatus of FIG. 1 provides the means (1) to transmit the condition or state of relays at the scan points through the MUX network and control logic of the FIG. 1 to the processor (scan), and (2) to drive relays in the matrix (i.e., changing their state) via the logic on signals from the processor (drive).

The elements acted on by the scan or drive units 20 and 22 may be congregated on printed circuit boards or cards with as many as 32 scan points per card. Each element, as mentioned, provides circuit isolation using optical coupling between the points being driven or scanned and the MUX network, thus eliminating both common mode and electro-mechanical noise. Using the configuration shown herein, the processor system through its scanner/distributor, multiplexer/demultiplexer (the multiplexer-demultiplexer being considered as stages 32, 34 and 36 and word/bit selector 30) and controller 31, is capable of addressing and reading a maximum of 32,768 network crosspoints. Since a typical 10,000 line Class 5 office with Local Automatic Message Accounting (LAMA) capability will require approximately 4,000 crosspoints to be scanned or driven, the scanner of the present invention has sufficient growth capacity to control such a system.

The drive units may also be congregated in a like manner with as many as thirty-two units per P.C. board or card. Each drive unit contains a flip-flop, optical isolator and driver transistor.

FIG. 1 is a schematic diagram of the scanner/distributor (S/D) system as applied to a system in which there is a crosspoint switching network 12 controlled by a processor 10 which, as mentioned, may be a 16-bit computer of any conventional make. The scanner/distributor system includes the controller circuit 31, the multiple stage multiplex/demultiplexer network comprised of a level selector 32, a group selector 34, a basket selector 36, word/bit selector 30, scanner units 22 or distributor or drive units 20.

The major purpose of the scanner/distributor (S/D) system is to allow the scanning and/or driving of a maximum of 32,768 crosspoints from a single controller and using a single tree network.

The path through the MUX is set using a 16-bit word from the processor. The bits of the word are used as follows:

| 15 14 13 12 | 11 | 10 9 | 8 7 6 | 5 4 3 | 2 1 0 |
|---|---|---|---|---|---|
| Bit Select | All | Level Select | Group Select | Basket Select | Word Select |

Figure 5:
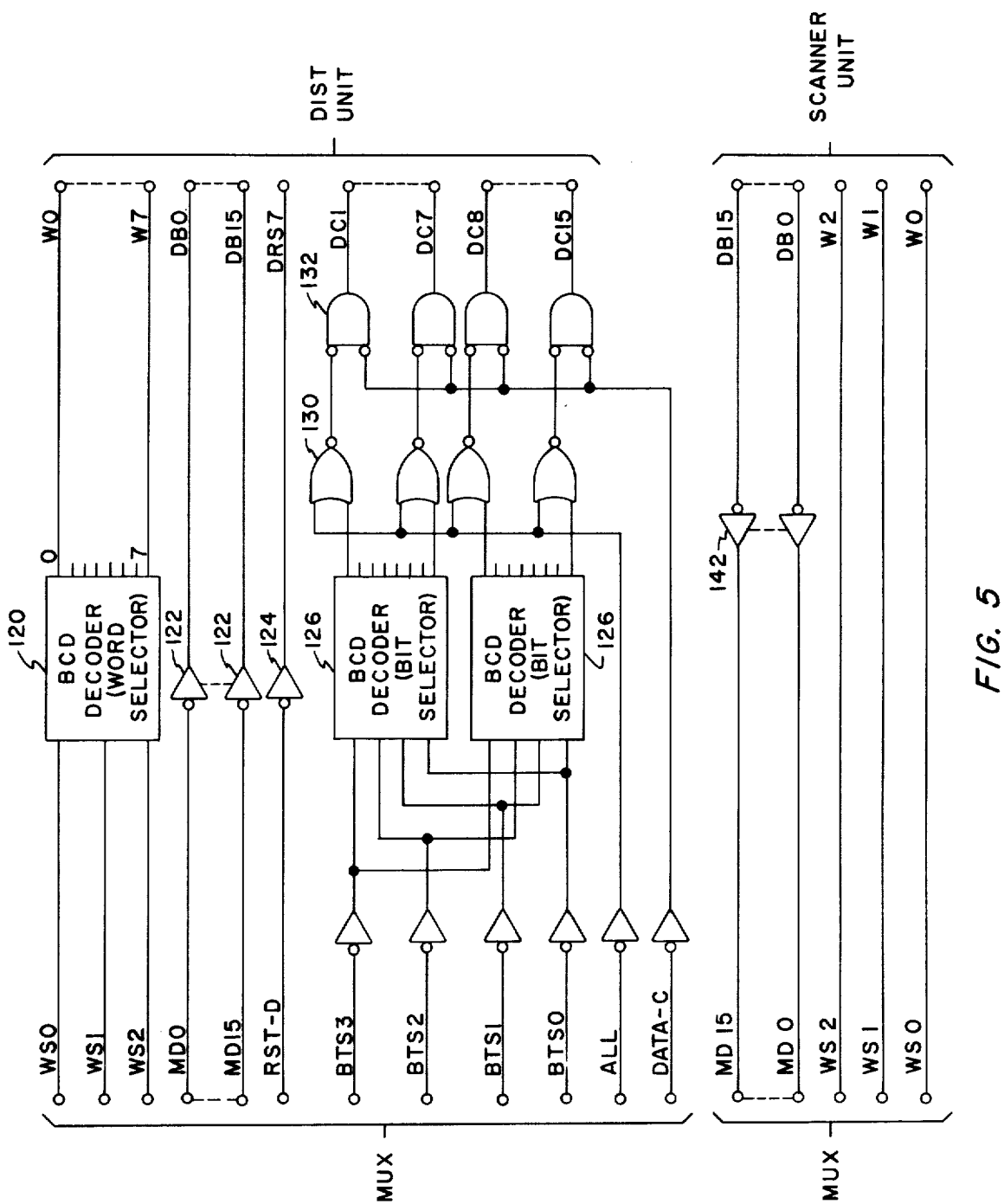
FIG. 5 is a schematic circuit diagram showing the word/bit selector of FIG. 1.

The level selector, group selector, basket selectors and word/bit selections are all binary to octal or octal to binary coder/decoder units with two or three bits of inputs as shown by the chart, the stages of decoding being shown in greater detail in FIG. 5. Of the bits used for addressing, the "All" bit is used to change the condition (or drive) all points having a common address word, while the bit select (4 bits) determines which individual point is to be driven.

Figure 2:
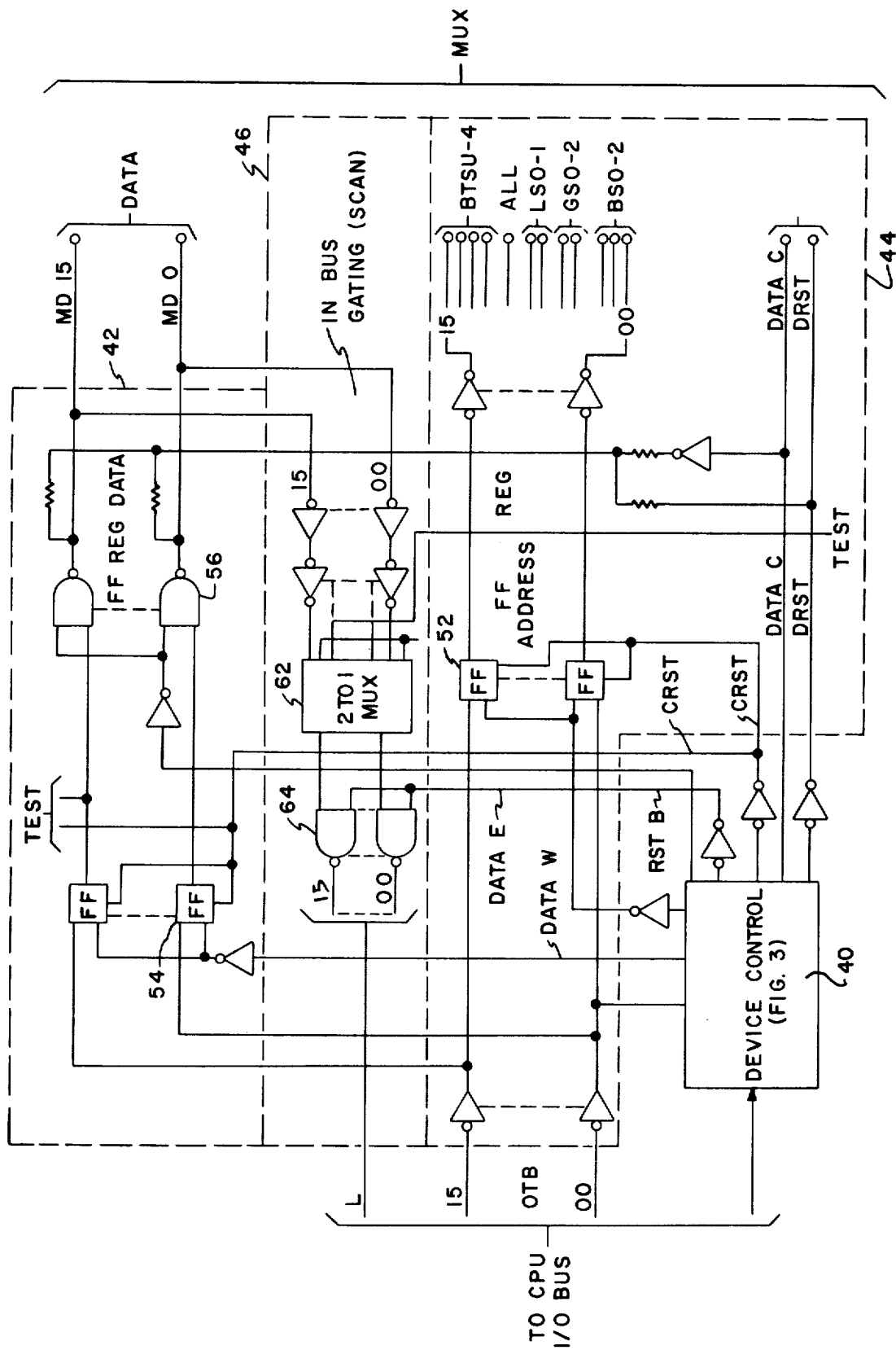
FIG. 2 is a schematic circuit diagram of the controller as shown in FIG. 1.
Figure 3A:
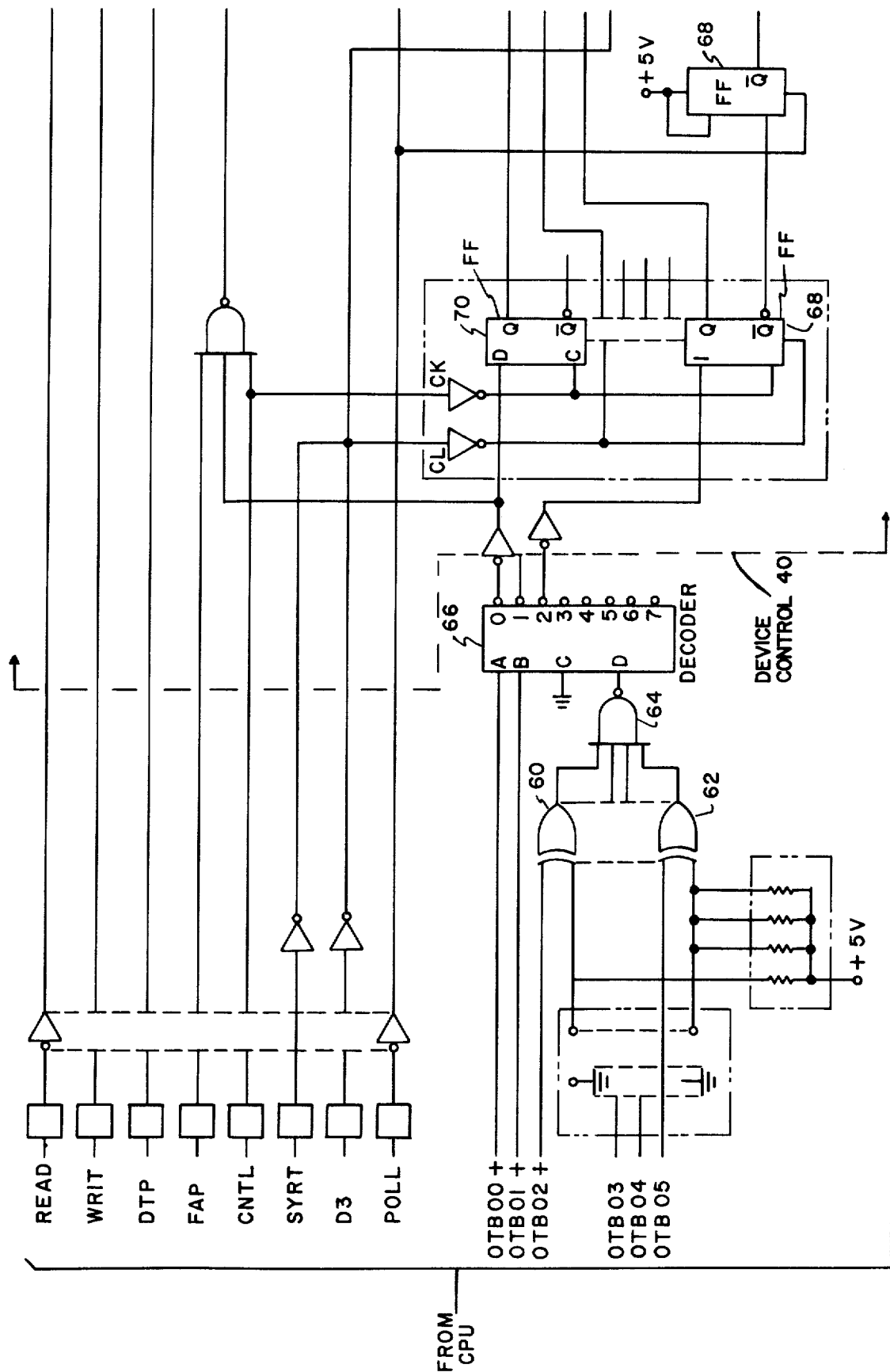
FIG. 3 is a block diagram showing the placement of FIG. 3A and 3B to comprise a diagram of the device control circuit of FIG. 1.

In FIG. 2, I show in semi-block form, the controller 31 which interfaces between the CPU 10 and the multiplexer network to select any one of the 16 bit paths through the network. The controller 31 is made up of four sub-circuits, these being the device control or logic circuit 40 (shown in detail in FIG. 3), the flip-flop registers 42 and 44 for temporarily storing data and address respectively and the in bus gating 46 for scanned information.

The device controller 31 provides logic for control of the transmission of information (including address and data) on the out bus from the CPU. The flip-flop (FF Reg Add) address register 42 receives and stores a 16 bit address word from the CPU used to select a MUX path. The flip-flop data register 44 receives data for transmission through a point once addressed and driven. The In bus gating 46 controls the input gating of scanned status information to the CPU from the multiplex network.

Thus, the device controller 31 provides buffer storage of data and for control of path selection into and out of the multiplex network.

The controller 31 of FIG. 2 receives its inputs from the I/O bus of the computer, and includes 16 address leads labeled OTB 00–15. These leads are connected to respective inverters 50 in the flip-flop register for addresses (44). The output of these inverters is also multipled to the input leads to the input leads to the flip-flop register for data (42). Certain of these leads OTB 00–05 and OTB 08–10 are also multipled to leads in the device control 40, as will be explained. A flip-flop stage comprised of a flip-flop 52 per input lead is provided in the address register 44, the storing of digits in the flip-flop and the resetting being controlled over respective leads ADD-E and CRST from the device control.

The data register 42 also has a flip-flop stage comprised of a flip-flop 54, one for each of the sixteen leads. Input to the flip-flop stage is controlled by the Data W lead from the device controller 40. A CRST lead from the controller controls the reset of the flip-flop stage. The flip-flop stage is followed by a gating stage with the gates 56 being controlled over a Data E lead from the control logic 40 for the flow of data to the terminals MD 00 to MD 15 and to the multiplex network.

The in bus gating or scan data has its input from the leads MD 00 to 15 and into the inverter stages 60 to the two-to-one multiplexer 62. Output from the multiplexer is passed to one input of the gating with the other input to the gates 64 being controlled from the device control 40 over the RSTB lead.

Thus, the controller provides bi-directional transfer of data over sixteen data leads between the CPU and the MUX network and unidirectional address transfer from the CPU to the MUX network.

In FIG. 3, I show the control logic 40 which receives its input from the CPU I/O Bus over the control terminals designated READ, WRITE, DTP, FAP, CNTL, SYRT, D3 and POLL and over the outgoing Bus address leads OTB 00–05, and OTB 08–10, the OTB leads being in parallel with the inputs to the flip-flop registers 42 and 44.

Leads OTB 00–01 are connected to two inputs of a three-bit input address decoder with eight parallel single-bit outputs. Leads OTB 02–05 are each connected to a respective signal input of an Exclusive OR gate. Four such gates are provided, two gates 60 and 62 being shown in FIG. 3A. The other inputs to the OR gates are strappable to ground or battery to bias the other gate input for the desired signal input, i.e., battery or ground. The Exclusive OR gates are address receptors from the processor. Thus if a high condition is desired as the gating signal, then the other OR gate input terminal is tied to ground. These OR gates receive an address and transmit the desired address to the NAND gate 64 for passage to the decoder 66.

For data control, the flip-flops 68 and 69 are driven by decoder 66 to provide the Data C leads. Responsive to a control signal directed to FF 68, a long pulse is generated. Reset of the flip-flop 68 by a subsequent reset signal ends the pulse. In this way, the control provides for drive, a drive point address, data for transmission to an address and a clock pulse to trigger the outflow of data. For scan, the scan address only need to be set.

The logic within control 40 under the control of the CPU enables the reading and writing of addresses and data along with resetting of the flip-flops. Latches are provided for testing, latches 70 and 72, and for the data reset, latch 74. For example, there is shown the latch having as its output the lead Reg T which determines whether the data register or address register is to be tested.

Figure 4:
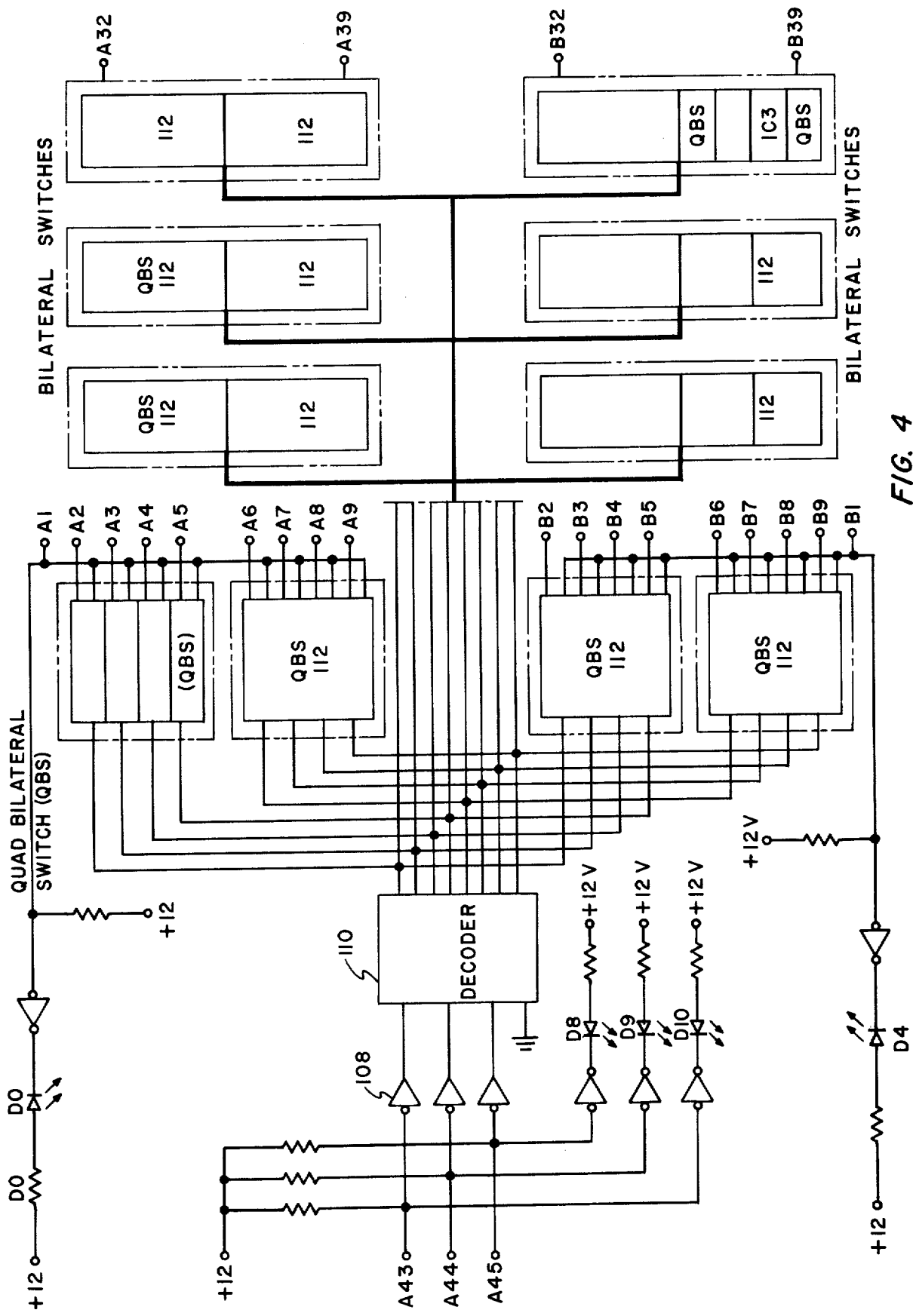
FIG. 4 is a typical modulator-demodulator stage in FIG. 1.

In FIG. 4 is shown a representative one of the MUX selection stages. The selection in a stage occurs through the use of the bits of the address noted in the chart herein. These three bits are transmitted through invertors 108 to the three bit input for an octal output through decoder 110. The octal outputs are each fed in multiple to the respective bilateral switches 112. The bilateral switches are quadded, there being four such bilateral switches within each of the 1C labeled blocks of FIG. 4. Such switches may be purchased as off-the-shelf items from RCA as COS/MOS Quad Bilateral switches. The output of the switches passes to the next stage for decoding of the necessary three bits.

The typical selector stage of the MUX as shown in FIG. 4 is used in the level selection receiving two input bits (bits 9 and 10) to provide up to four outputs, the group selection stage receiving and decoding three bits (bits 6-8) for its eight outputs, and the basket selection stage (bits 3-5) with eight outputs.

Viewing the stages individually in FIG. 1, the level selector 32 decodes bits 9 and 10 to determine which one of 4 groups of 8192 points are to be selected. After the path is set, the remainder of the bits in the CPU data word, 13 bits, and Data C and DRST leads are demultiplexed to the selected one of four group selectors. Also, 16 bi-directional lines are switched to the selected group.

The group selector 34 decodes bits 6, 7 and 8 to select one of eight basket selectors which contains 1,024 points each. The remainder of the CPU word, ten bits and Data C and DRST lines are demultiplexed to the selected basket. Also, sixteen bi-directional lines are switched to the selected basket selector.

The selected basket selector 36 decodes bits 3, 4 and 5 to select one of eight word/bit selectors which contains 128 points each. The remainder of the CPU word, seven bits and Data C and DRST lines are demultiplexed to the selected word/bit selector. Likewise, 16 bi-directional lines are switched to the selected word/bit selector.

FIG. 5 shows the word/bit selector, the word selector employing three bits of inpt (bits 0-2) activate one of its eight outputs, and the bit select (bits 12-15) to activate one of the bits of the selected word. Thus, for word selection, three inputs WS0-WS3 from the prior stage are provided at the input of the BCD to Decimal Decoder 120 with eight outputs W0-W7 fed to the distributor unit of FIG. 7. For the transmission of data once a point has been driven, data leads MD 0-15 and reset for data lead RST-D are fed through respective inverters 122 and 124 to data leads DB0-DB15 and Reset Lead DRS7.

For bit selection, four bits of input are provided to the BCD to decimal decoder 126 for passage through NOR gates 130 and the NAND gates 132 as clocked from lead Data C. An "All" bit lead (bit 11) to drive all points represented by bits within a selected word enables all the NOR gates within a selected word. The "All" lead is multipled to one input of the NOR gates 130 to clock a pulse through each NAND gate of a selected word on receipt of a data clock pulse on lead DATA-C.

As can be seen in FIG. 5, leads WS0-WS2 from the MUX network are multipled to the distributor word decoder and to the scan decoding section. For writing or operating a drive unit, a control signal from the processor on the data W lead from the logic circuit enables the selected individual drive unit or word plurality of drive units represented by a word.

Data leads MD0-MD15 are used for the bidirectional transfer of data whether it be scan data to the processor or data from the processor.

After the MUX network has been set for the driving of a crosspoint, another 16-bit word from the CPU is placed on the bi-directional lines which are connected via the MUX network to the D leads of the flip-flops on the respective distributor boards of FIG. 7. There is one flip-flop 140 per drive point to provide a memory of the drive point condition. After the data has stabilized, the CPU issues a data clock command, Data C, and the word bit selector enables one of sixteen or all sixteen points selected by the word select bits and the flip-flop of the drive point is clocked.

In FIG. 7 is shown a typical distributor or relay drive unit. Shown in detail is one drive unit Q33 and the circuits which feed into Q33 and similar units Q34-Q40 shown only by block Q40. For the remaining drive units of a board, i.e., Q41-Q64 only blocks have been shown, it being understood that the circuits of these blocks are essentially identical to those shown in detail. The output of the decoders of the word/bit selectors for lead WS0-WS7 are fed through inverters 141 to respective inputs of the NAND gates 150 for passage to the respective flip-flops 142, there being one flip-flop for each gate output. The gating to the flip-flop is controlled by the respective bit leads DC0-DC3. The flip-flops are dual flip-flops with reset and are triggered by the data input leads DB0-15 to provide memory of a condition when respective bits or points have been set. A bit or point remains in a condition once set until reset by a pulse on the reset lead properly addressed.

Each relay driver unit includes an amplifier 152 which provides an output responsive to negative potential applied to the amplifier input. The potential is transmitted through a LED 154 to activate the cascaded transistors 156, 158 and 160 in the output. With the final transistor 160 of the series "on", a relay R (FIG. 1) connected to lead such as SDP-OO is turned on and locks itself to ground through diode D2 and transistor 160.

For scan purposes, the desired leads WS0, WS1 and WS2 (FIG. 5) are addressed to select one of the eight words to be received by the word/bit selector. A word comprised of sixteen scan units or points in the switching network are accessed, and their state, 1 or 0, is reflected in the sixteen points of a word simultaneously and the results transmitted on the respective leads DB0-DB15 back through the data leads of the network to the processor, which can determine the condition of one or more of the addressed scan units.

Figure 6:
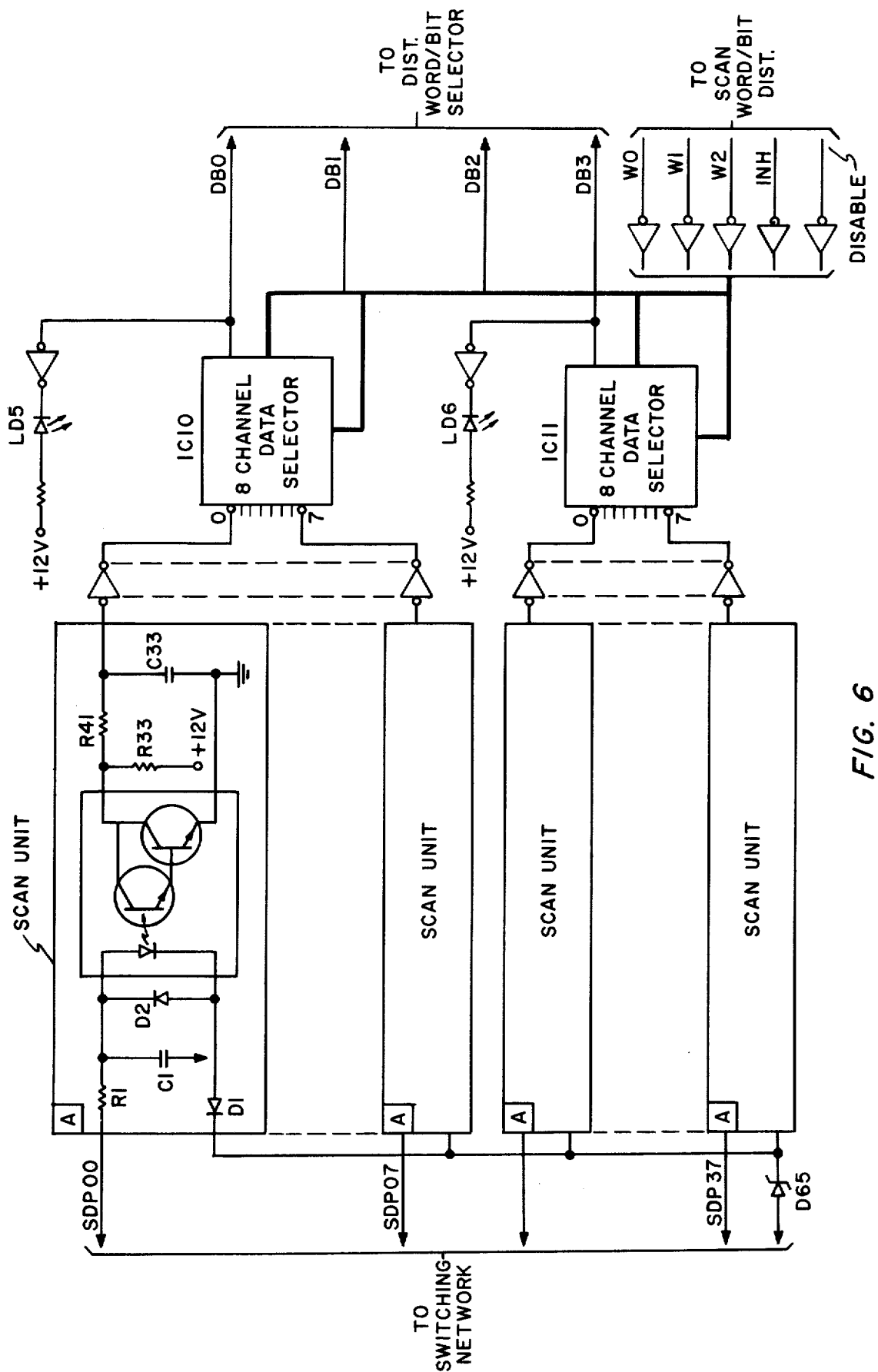
FIG. 6 is a schematic circuit diagram of a scanner unit of FIG. 1.

The scan units of FIG. 6 read the condition of the point having been addressed. The scan unit detects the condition of the point being scanned by determining the presence or absence of ground on the lead SDP-OO.

With the relay (R) being operated and resulting ground on the SDP lead (such as SDP-OO), the ground condition is manifested over a path through the high impedance of resistor R1 and through Diodes D1, D2 and the common zener diode D65 to the LED 160 and output transistor 162. The scan output passes through inverter 166 and the eight channel data selector 162 to the MUX network.

For the transmission of scanned information in the reverse (point to CPU) direction, data leads DB 0-15 of FIG. 5 are connected to the input to respective inverters 142 to output data leads MD 0–15 to the MUX stages. The control leads W0–W3 pass directly through the word/bit selector on respective output leads WS0–WS3. The sixteen bidirectional lines are buffered on this card.

The scanner selector (FIG. 5) decodes bits W0, W1 and W2 and enables one of eight words which contain 16 points each. These sixteen points are gated to the 16 bi-directional paths which have previously been established between the controller and selected scanners. Therefore, the CPU scans sixteen points simultaneously.

For the scan, the final scan output on the lead in each of sixteen consecutive selectors sends a signal back on all sixteen leads to make one sixteen-bit word. Once the scan has been completed and the condition signal sent, the scan is over and no further steps are required.

The zener diode D65 acts to inhibit the flow of current through the LED until a set voltage difference is detected. This compensates for differences in power supply voltages throughout a telephone switching office. The zener diode along with resistance R1 and capacitor C1 also establishes the delay from input to output.

The operation of the circuit of FIG. 6 will be described using a positive voltage or ground on the input at contacts 50 to produce an output. This condition is the most common mode of operation in a telephone office with +V being ground and −V being −48V. If −V and +V are reversed, then the circuit will work equally well by reversing the polarity of D1, D65 and the LED portion of the optical isolator.

In the system disclosed, when a positive potential is applied at the input, current will flow through the LED causing the detector portion of the optical isolator to turn on. This, in turn, changes the output state of the final inverter.

A condition causing an LED to conduct will pass through the inverter and onto the octal input to the channel data selector for decoding onto three data leads for transmission back through the network as data for transmission to the CPU. This data is similar to the data which is fed from the CPU to a point once driven.

It should be noted that various test capabilities have been provided in the system. Since these test components are not germane to the substance of the present invention, they have not been described.

I have now shown a bi-directional matrix comprised of a solid state scanner/distributor network using a multiplexer-demultiplexer to allow the scanning and/or driving of up to 32,768 points from a single logic controller. All points within a 16-bit word or individual points may be driven or have their condition changed. In the system as shown, scanner units and drive units may be replaced interchangeably for a particular word.

The number of points being scanned may be any value less than the maximum number stated and the system may be expanded to the maximum by the addition of scan or drive units.

I claim:

1. A scanner-distributor system for testing the condition of at least one of a plurality of bi-stable elements of a processor-controlled switching network, and for changing the condition of selected ones of said elements, said system comprising a plurality of drive units each coupled to one of said elements and each individually activatable for changing the condition of the coupled element on activation of the coupled drive unit, and a plurality of scan units each coupled to one of said elements for testing the condition of the element on activation of the coupled scan unit, with each of said elements being represented by a predetermined address word for controlling access to that element, an electronic plural stage multiplexer for accessing each of said drive units and scan units through the use of a multiple bit address word emanating from said processor with each stage of said multiplexer network corresponding to certain bits of address word of a selected element, and logic means for controlling the transmission of a selected address word from said processor through said multiplexer to select the drive unit coupled to the element represented by the selected address word, and said logic means operative to activate a plurality of drive units represented by a predetermined portion of a selected address word to change the condition of all elements having said predetermined portion in their addresses.

2. A system as claimed in claim 1, wherein each said scan unit includes means activated by a certain portion of said address word for reading the condition of the element coupled thereto for transmission to said processor, and means for activating a plurality of scan units responsive to receipt of a signal in said predetermined portion of said word to transmit over said multiplexer network a signal indication of the condition of the plurality of elements read.

3. A system as claimed in claim 1, wherein there are data transmission means in said logic means operative after activation of a drive unit for transmitting data from said processor over a path through said multiplexer and the element of said activated drive unit.

4. Apparatus for addressing the crosspoints of a telecommunications switching network operating under the control of a central processor, in which said apparatus comprises a common logic circuit and multiple stage multiplexer, said logic circuit including an input-output bus directed to said processor for the bidirectional transfer of address words and data words, each crosspoint of said network being represented by a multiple bit address word to enable completion of a path through the multiplexer from said logic circuit to a selected crosspoint on transmission of the address representing the selected crosspoint, each said crosspoint having associated therewith a scan unit and a drive unit with one of said units individually operative responsive to a command signal from said logic circuit to an addressed crosspoint to cause operation of the commanded unit, each scan unit operative on a scan command from said logic circuit to read the condition of the associated crosspoint to return a signal indicative of the scanned condition to the logic circuit, and each drive unit responsive to a command signal from the logic circuit to drive the addressed crosspoint to signal transmissive condition to allow the passage of data through the driven crosspoint.

5. Apparatus as claimed in claim 4, in which said crosspoints are grouped and in which said logic circuit controls the enablement of the crosspoints of said group in response to the setting of a predetermined bit of the address word transmitted through the multiplexer.

6. Apparatus as claimed in claim 4 in which each of said units optically isolates the respective unit from the associated crosspoint.

7. Apparatus as claimed in claim 5, in which each of said drive units includes means responsive to the drive command signal to the crosspoint associated with it for maintaining the crosspoint in the driven condition.

* * * * *